US010451911B2

(12) United States Patent
Dighde et al.

(10) Patent No.: US 10,451,911 B2
(45) Date of Patent: Oct. 22, 2019

(54) DISPLAY DEVICE

(71) Applicant: Microsoft Technology Licensing, LLC, Redmond, WA (US)

(72) Inventors: Rajesh Manohar Dighde, Redmond, WA (US); Kabir Siddiqui, Sammamish, WA (US); Minhyuk Choi, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/627,301

(22) Filed: Jun. 19, 2017

(65) Prior Publication Data

US 2018/0246355 A1    Aug. 30, 2018

Related U.S. Application Data

(60) Provisional application No. 62/475,145, filed on Mar. 22, 2017, provisional application No. 62/465,137, filed on Feb. 28, 2017.

(51) Int. Cl.
*G02F 1/1335* (2006.01)
*G02F 1/13357* (2006.01)
(Continued)

(52) U.S. Cl.
CPC ......... *G02F 1/1335* (2013.01); *G02B 6/0081* (2013.01); *G02F 1/0311* (2013.01);
(Continued)

(58) Field of Classification Search
CPC ....... G02F 1/1335; G02F 2001/133317; G02F 1/1336; G02F 1/133528; G02F 1/133553;
(Continued)

(56) References Cited

U.S. PATENT DOCUMENTS 8,872,997 B2    10/2014  Rothkopf et al.
9,297,948 B1    3/2016   Zhou
(Continued)

FOREIGN PATENT DOCUMENTS

EP    2388687 A2    11/2011
EP    2728433 A1    5/2014
(Continued)

OTHER PUBLICATIONS

Kapur, V., "How phone screen with world's thinnest border was made," Emirates 24/7 Website, Retrieved Online at emirates247.com/business/technology/how-phone-screen-with-world-s-thinnest-border-was-made-2014-11-01-1.568403, Nov. 1, 2014, 5 pages.
(Continued)

*Primary Examiner* — Nathanael R Briggs
*Assistant Examiner* — William D Peterson
(74) *Attorney, Agent, or Firm* — Alleman Hall Creasman & Tuttle LLP

(57) ABSTRACT

A display device comprises a first chassis and a first backlight housing attached to the first chassis and comprising a first wall. A first optical film layer between a first light guide plate and a first rear polarizer comprises a secured end bonded to the first wall. A second chassis is rotatably coupled to the first chassis and includes a second backlight housing attached to the second chassis and comprising a second wall. A second optical film layer between a second light guide plate and a second rear polarizer includes a secured end bonded to the second wall.

20 Claims, 13 Drawing Sheets

(51) Int. Cl.
*F21V 8/00* (2006.01)
*G02F 1/03* (2006.01)
*G02F 1/133* (2006.01)
*G02F 1/1333* (2006.01)
*G06F 1/16* (2006.01)

(52) U.S. Cl.
CPC ............ *G02F 1/133* (2013.01); *G02F 1/1336* (2013.01); *G02F 1/133308* (2013.01); *G02F 1/133528* (2013.01); *G02F 1/133553* (2013.01); *G06F 1/1641* (2013.01); *G02F 2001/133317* (2013.01); *G02F 2001/133331* (2013.01)

(58) Field of Classification Search
CPC .. G02F 1/0311; G02F 1/133; G02F 1/133308; G02F 1/1641; G02F 2001/133331; G02B 6/0081
USPC .......................................................... 349/73
See application file for complete search history.

(56) References Cited

U.S. PATENT DOCUMENTS

| | | |
|---|---|---|
| 2005/0280751 A1 | 12/2005 | Kim et al. |
| 2007/0115692 A1* | 5/2007 | Yao ...................... G02B 6/0088 362/632 |
| 2007/0127144 A1 | 6/2007 | Gao |
| 2008/0203907 A1 | 8/2008 | Lee et al. |
| 2010/0014015 A1 | 1/2010 | Ho et al. |
| 2011/0175086 A1 | 7/2011 | Katoh et al. |
| 2011/0187956 A1 | 8/2011 | Kim et al. |
| 2011/0279961 A1 | 11/2011 | Shedletsky et al. |
| 2011/0285607 A1* | 11/2011 | Kim ...................... G06F 1/1616 345/1.3 |
| 2013/0038809 A1 | 2/2013 | Hung et al. |
| 2013/0148046 A1 | 6/2013 | Chang et al. |
| 2013/0155351 A1 | 6/2013 | Garelli et al. |
| 2013/0235561 A1 | 9/2013 | Etienne et al. |
| 2013/0257685 A1 | 10/2013 | Kim |
| 2013/0263488 A1 | 10/2013 | Wu et al. |
| 2013/0271957 A1 | 10/2013 | Etienne et al. |
| 2013/0308296 A1 | 11/2013 | Yoo et al. |
| 2014/0049522 A1 | 2/2014 | Mathew et al. |
| 2014/0145150 A1 | 5/2014 | de Jong et al. |
| 2014/0177268 A1 | 6/2014 | Zhou |
| 2015/0212361 A1 | 7/2015 | Zhao et al. |
| 2015/0247967 A1* | 9/2015 | Horiuchi .............. G02B 6/0085 362/611 |
| 2015/0323831 A1 | 11/2015 | Yang et al. |
| 2015/0362666 A1 | 12/2015 | Jia et al. |
| 2016/0085109 A1 | 3/2016 | Baek et al. |
| 2016/0274296 A1 | 9/2016 | Zhou |
| 2016/0320658 A1* | 11/2016 | Reightler .......... G02F 1/133308 |
| 2016/0320660 A1 | 11/2016 | Jean et al. |
| 2018/0246365 A1 | 8/2018 | Choi et al. |

FOREIGN PATENT DOCUMENTS

| | | |
|---|---|---|
| KR | 20090030903 A | 3/2009 |
| WO | 2015041388 A1 | 3/2015 |
| WO | 2015069640 A1 | 5/2015 |
| WO | 2016105022 A1 | 6/2016 |

OTHER PUBLICATIONS

"Non Final Office Action Issued in U.S. Appl. No. 15/627,265", dated Feb. 25, 2019, 10 Pages.

"International Search Report and Written opinion Issued in PCT Application No. PCT/US18/019612", dated Aug. 1, 2018, 19 Pages.

"Notice of Allowance Issued in U.S. Appl. No. 15/627,265" dated Jul. 1, 2019, 9 Pages.

* cited by examiner

DISPLAY DEVICE

CROSS REFERENCE TO RELATED APPLICATIONS

This application claims priority to U.S. Provisional Patent Application No. 62/475,145 filed Mar. 22, 2017, and to U.S. Provisional Patent Application No. 62/465,137 filed Feb. 28, 2017, the entirety of which are hereby incorporated herein by reference.

BACKGROUND

Some display devices include an active display area operable to output visible imagery and a non-active display area in which visible imagery is not displayed. A bezel between an outer edge of the active display area and an outer edge of a device chassis may define at least a portion of the non-active display area.

SUMMARY

A display device may comprise a first chassis and a first backlight housing attached to the first chassis, with the first backlight housing including a first wall. A first optical film layer is between a first light guide plate and a first rear polarizer, the first optical film layer comprising a secured end bonded to the first wall. A second chassis is rotatably coupled to the first chassis and includes a second backlight housing comprising a second wall. A second optical film layer is between a second light guide plate and a second rear polarizer, with the second optical film layer comprising a secured end bonded to the second wall.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In the drawings, like reference numerals indicate like parts throughout the various views, except where indicated otherwise.

DETAILED DESCRIPTION

As noted above some display devices, such as mobile display devices, may include an active display area in which display elements operate to produce visible imagery, and a non-active display area in which displayed imagery is not visible. In some examples electronics that drive operation of the display elements may be disposed in the non-active display area. The non-active display area may occupy a perimeter portion of the display device—e.g., the perimeter portion may surround the active display area. The non-active display area may be defined by a bezel between an outer edge of the active display area and an outer edge of a device chassis.

In some examples, the bezel may include a structure such as a black mask that conceals the non-active display area. To maximize the active display area of a display device, and correspondingly increase the aesthetic qualities of the device, it is desirable to minimize the size of the bezel. However, in some displays a reduction in bezel width may be limited by display component placement, configurations, tolerances and other considerations. For example, in some configurations a cover glass portion and one or more display components extend over and are bonded to an outer edge of the device chassis. These and other configurations may require minimum bezel widths of at least 2 mm. in a single display unit.

In dual-display devices that include two side-by-side displays, such as a hinged dual-display device, such configurations may result in a deadband region between a first active display area edge of the first display unit and a second active display area edge of the second display unit having a width of 4 mm. or more. Such bezel widths and deadband regions can provide a less-than-optimal aesthetic appearance and user experience. Additionally, in some configurations and to account for component assembly tolerances and/or component expansion or shrinkage due to thermal fluctuations, one or more gaps between display components and structural elements may be provided. In some configurations, such gaps may allow for undesirable light leakage from a light source of the display.

Figure 1:
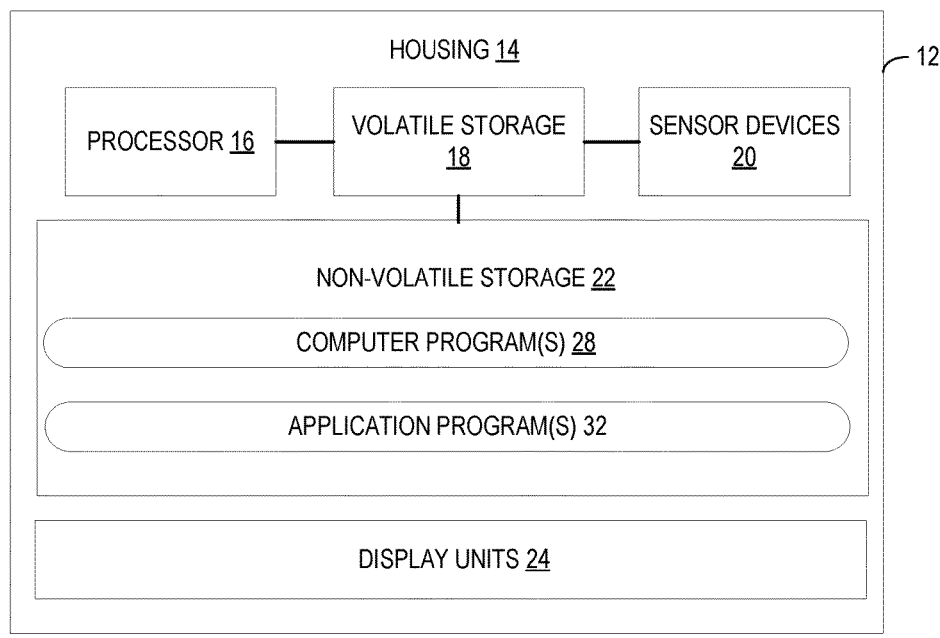
FIG. 1 shows a schematic diagram of a dual-display device according to examples of the present disclosure.

Examples are described herein for providing display devices having display component configurations and structures that minimize a bezel width and address light leakage issues. FIG. 1 schematically illustrates an example of a display device in the form of a mobile computing device 12 including a housing 14. As described in more detail below, the housing 14 may take the form of two chassis that each surround internal electronics and provide structure for displays, sensors, speakers, buttons, etc. As shown in the examples described below, two side-by-side display units 24 may be may be housed in the two chassis that are rotatably coupled via one or more hinges.

The housing 14 may include a processor 16, volatile storage device 18, sensor devices 20, and non-volatile storage device 22. The processor 16 is configured to execute one or more computer programs 28, which may be an operating system or control program for the mobile computing device, and one or more application programs 32 stored on the non-volatile storage device 22, and to enact various control processes described herein.

The sensor devices 20 may include a plurality of different sensors, such as, for example, an accelerometer, an ambient light sensor, a forward-facing camera, a microphone, a speaker, a depth camera, etc. The sensor devices 20 may also include a capacitive touch sensor, such as a capacitive array that is integrated with each of the one or more display units 24. It will be appreciated that the examples listed above are exemplary, and that other types of sensors not specifically mentioned above may also be included in the sensor devices 20 of the mobile computing device 12.

Figure 2:
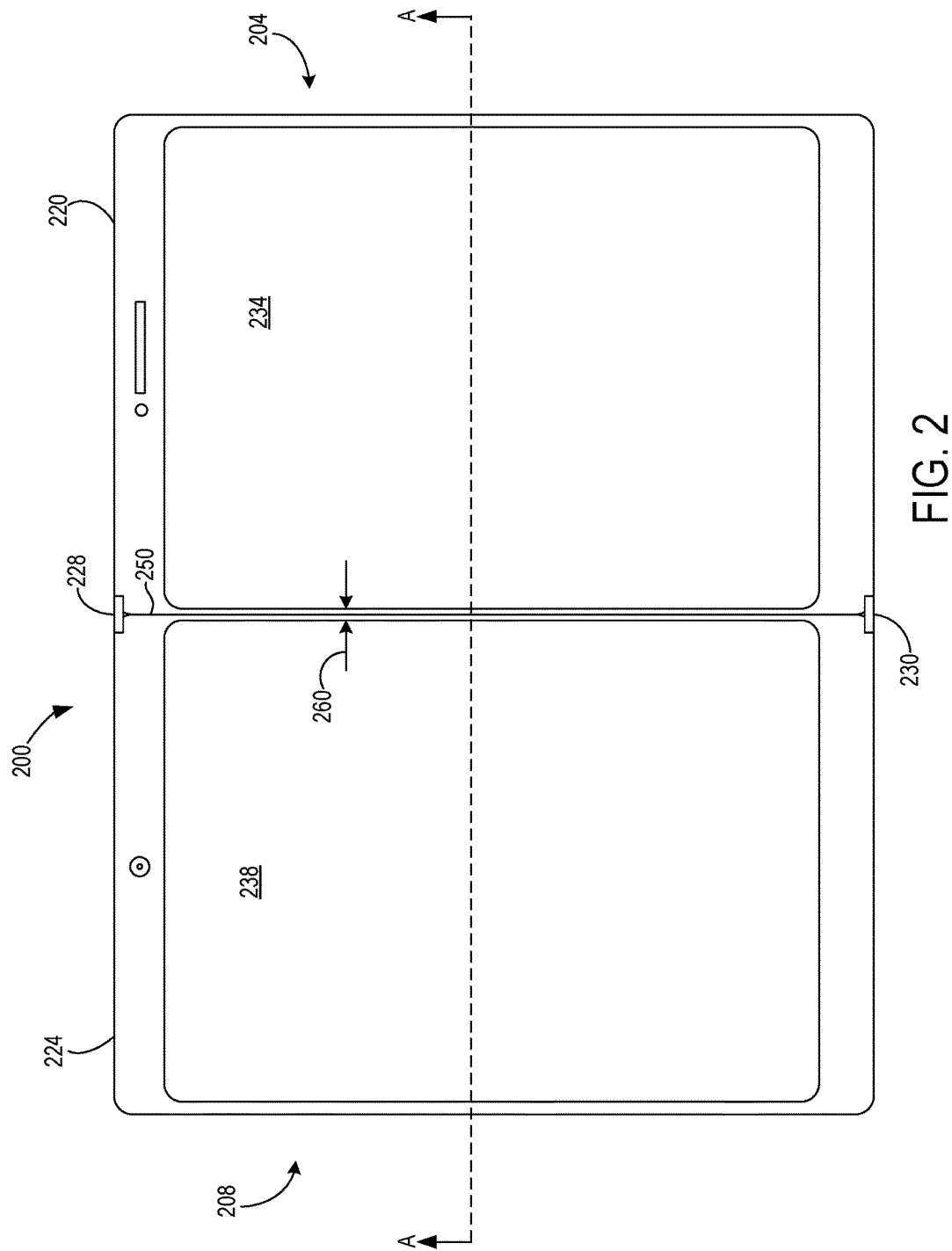
FIG. 2 shows a top view of a dual-display device according to examples of the present disclosure.

In the example dual-display device illustrated in FIG. 2, the sensor devices 20 include a forward-facing camera 30 and a speaker 34. In some examples, the mobile computing device 12 may take the form of a smart phone device. In another example, the mobile computing device 12 may take other suitable forms, such as a tablet computing device or other computing device having side-by-side displays.

With reference now to FIGS. 2-7, an example dual-display device 200 having two separate displays that are rotatably coupled according to examples of the present disclosure is illustrated. In this example and as illustrated in FIG. 2, a first chassis 220 that houses the right side display 204 is rotatably coupled to a second chassis 224 that houses the left side display 208 via hinges 228, 230. In some examples, the hinges 228, 230 are configured to permit the pair of displays 204, 208 to rotate about axis 250 between angular orientations from a face-to-face angular orientation to a back-to-back angular orientation.

Figure 3:
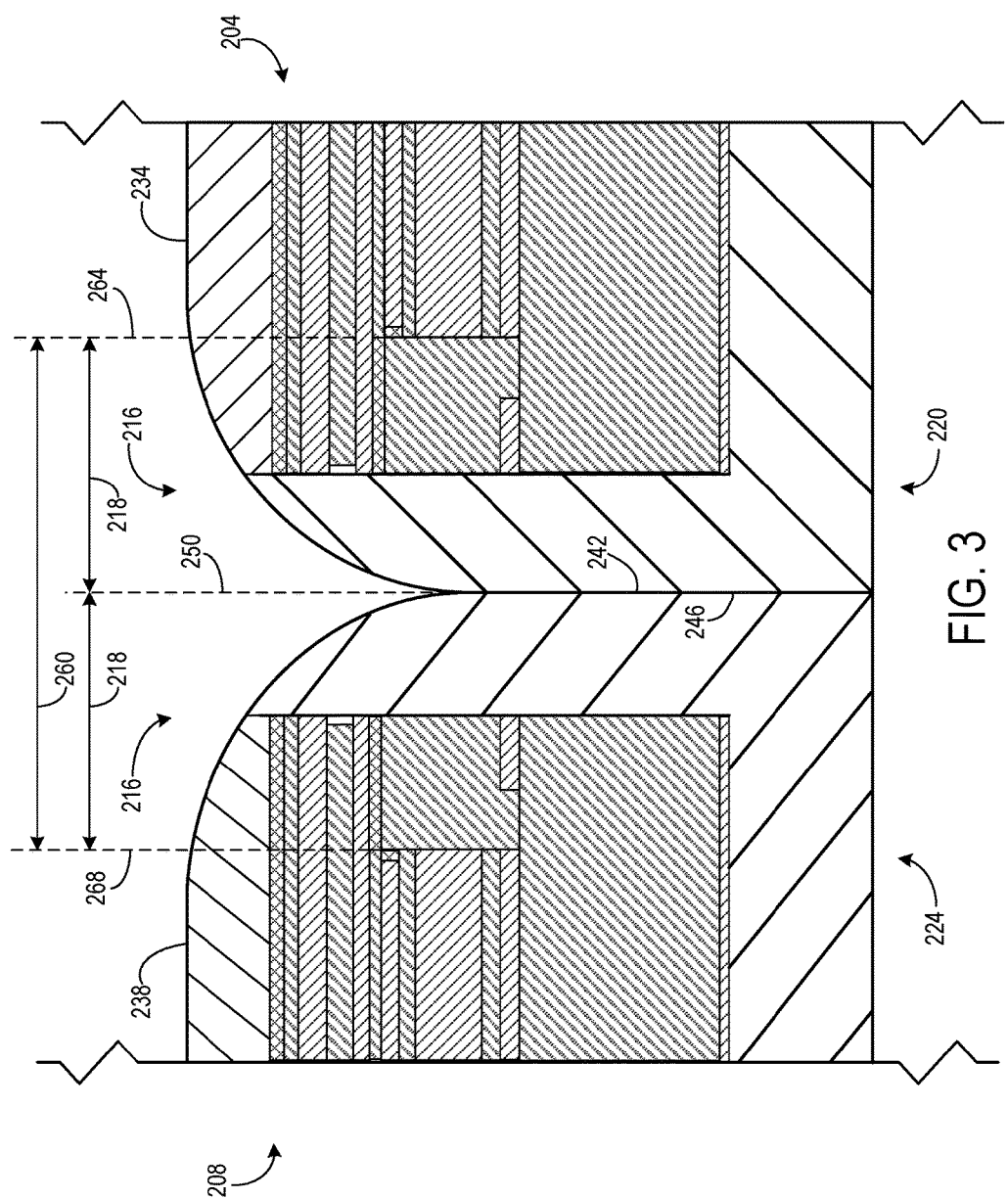
FIG. 3 shows a partial cross section view of the dual-display device taken along line A-A of FIG. 2 according to examples of the present disclosure.

Hinges 228, 230 may permit the pair of display 204, 208 to rotate relative to one another such that an angle between them can be decreased or increased by the user applying suitable force to the chassis that house the displays. As shown in FIGS. 2 and 3, the first chassis 220 and second chassis 224 may be rotatably coupled in a manner that enables the right side display 204 and left side display 208 to be placed side-by-side in a 180 degree orientation, such that the two cover glass substrates 234, 238 are substantially parallel.

Figure 4:
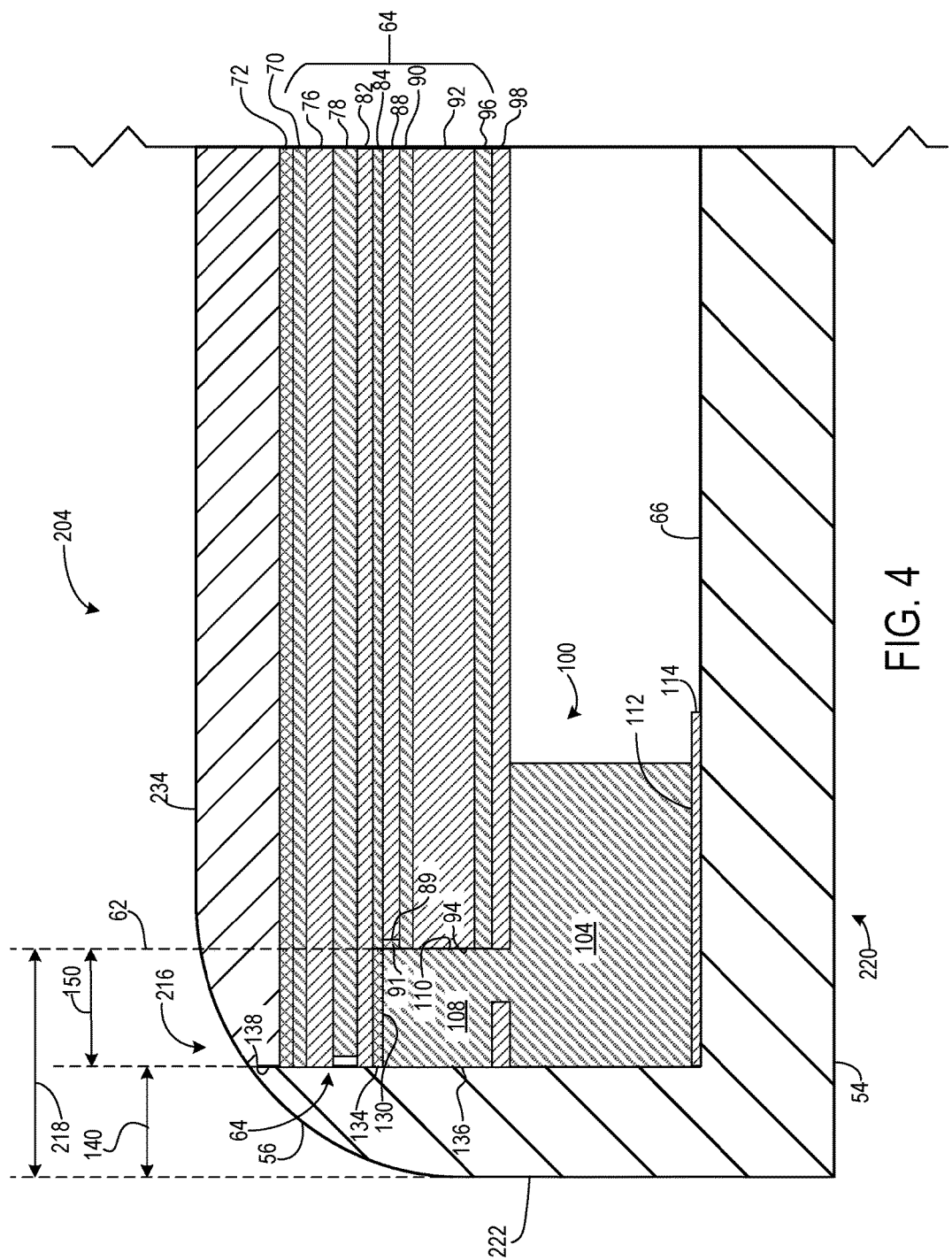
FIG. 4 shows a partial cross section view of a right side display of the dual-display device of FIG. 2 according to examples of the present disclosure.

As shown in FIGS. 2-4, in this side-by-side orientation the left edge 242 of the first chassis 220 and the right edge 246 of the second chassis 224 are abutting along a common axis 250. In this manner, and with reference to FIG. 4 and the descriptions for this configuration provided below, each of the right side display 204 and left side display 208 may provide a non-active display area having a bezel width 218 of approximately 1.14 mm. In this manner, the dual-display device 200 may provide a deadband region 260 between a first active display area edge 264 of the right side display 204 and a second active display area edge 268 of the left side display 208 having a width of approximately 2.28 mm. Advantageously, such a reduced size of the deadband region 260 may provide more pleasing user experiences as compared to existing dual-display devices having larger deadband regions, particularly with applications utilizing the two displays in the side-by-side, 180 degree orientation.

FIG. 4 shows a partial sectional view taken along line A-A of FIG. 2 of a portion of a left side of the right side display 204 of the mobile computing device 200 according to one example of the present disclosure. In this example, the configuration of the display shown FIG. 4 may be utilized for the right side display 204, and a mirror image of this configuration may be utilized for the left side display 208. In this example, the chassis 220 comprises a bottom portion 54 and a left projection 56 extending from the bottom portion. It will be appreciated that the chassis 220 also includes a right projection (not shown) on the opposite side of chassis 220 from the left projection 56 that similarly extends from the bottom portion 54. In some examples the right projection may be a mirror image of the left projection 56.

Cover glass substrate 234 overlies the components of a display unit 64 that are located between the cover glass substrate and a floor 66 of the bottom portion 54 of the chassis 220. In one example the display unit 64 may comprise a liquid crystal display (LCD). In this example, the cover glass substrate 234 is bonded to a front polarizer layer 70 with an optically clear adhesive layer 72. Below the front polarizer layer 70 is a color filter glass substrate 76 and a display glass substrate 78. In this example, the display glass substrate 78 comprises thin films of an active semiconductor layer, a dielectric layer and metallic contacts deposited over a supporting glass substrate.

In this example, below the display glass substrate 78 is a rear polarizer layer 82 and a layer of rim tape 84. In other examples a different layer of reflective material may be utilized in place of rim tape 84, such as a layer of film, ink or other reflective coating. In these examples, such reflective material may be provided near the perimeter of the active display area to reflect back light that otherwise may leak from the edge of the display. In other examples, an air gap may be provided in place of rim tape 84 to provide margin for component tolerances within the LCD and other display components.

Below the rim tape 84 is an upper optical film layer 88 and a diffuser substrate 90. A light guide plate 92 is positioned below the diffuser substrate 90. In one example, a light source (not shown) is positioned to face the end surface 94 of the light guide plate 92. Light emitted by the light source enters the light guide plate 92 through the end surface 94 and is directed through the upper surface of the light guide plate and the upper optical film layer 88 and other layers above to illuminate the display glass substrate 78.

Below the light guide plate 92 is a reflective film layer 96 and a back plate 98 of a backlight unit. The backlight unit may comprise a backlight housing 100 that includes a base 104 and a projection portion 108 extending through an aperture in the back plate 98 and comprising an inner wall 110. In some examples the base 104 and projection portion 108 may comprise an elastomeric material, such as a thermoplastic elastomer. In the example of FIG. 4, the base 104 of the backlight housing 100 comprises a footing 112 that is bonded to floor 66 of the chassis 220 with an adhesive layer 114.

Figure 5:
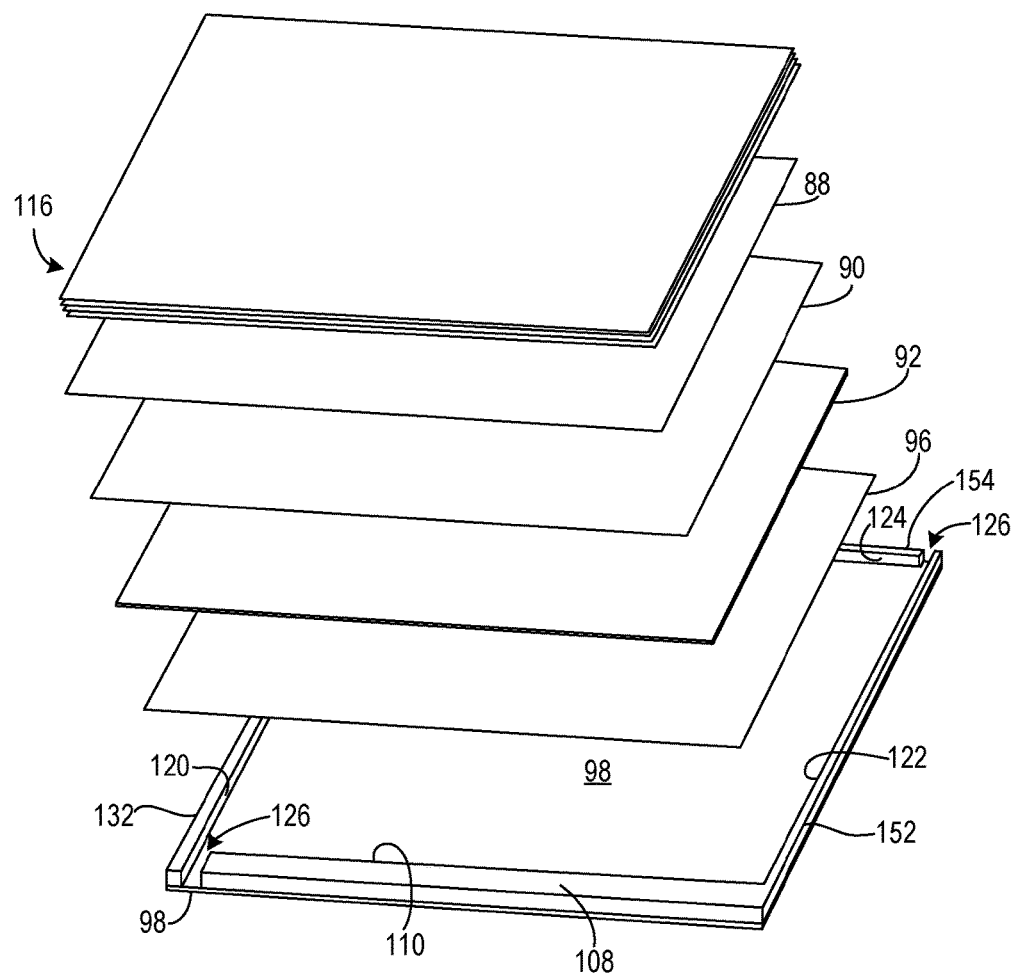
FIG. 5 shows an exploded view of a backlight housing and components of a display unit according to an example of the present disclosure.
Figure 6:
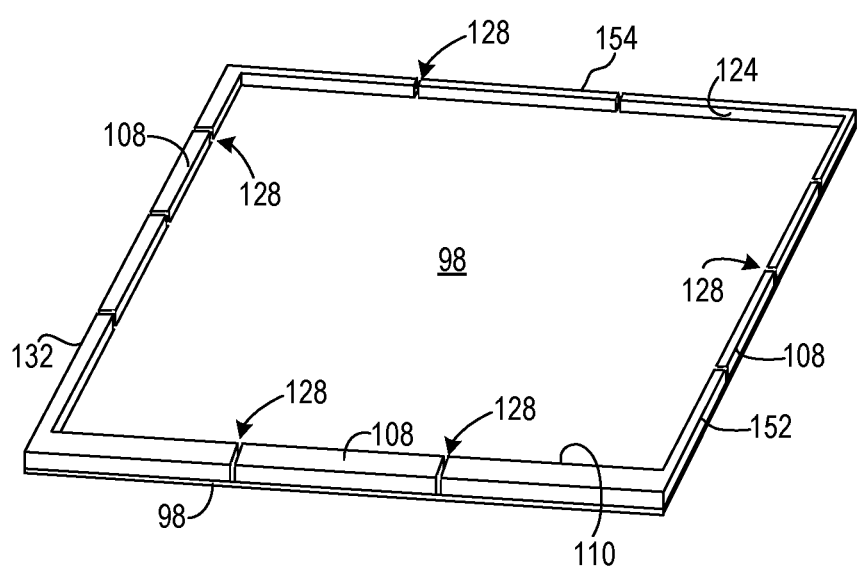
FIG. 6 shows a backlight housing according to other examples of the present disclosure.

With reference now to FIG. 5, in some examples the projection portion 108 of backlight housing 100 may be heat staked to the back plate 98. In this partial exploded view, the LCD unit 116 comprises the front polarizer layer 70, color filter glass substrate 76, display glass substrate 78 and rear polarizer layer 82. The upper optical film layer 88, diffuser substrate 90, light guide plate 92, and reflective film layer 96 may be contained within the walls 110, 120, 122 and 124. In this example, spacings 126 are provided between projection portion 108 and top portion 132, and between bottom portion 152 and outer portion 154, to allow for thermal expansion and contraction of these portions of backlight housing 100.

In other examples the projection portion 108 of backlight housing 100 may be molded or bonded to the back plate 98. In one example and with reference to FIG. 6, the projection portion 108, top portion 132, bottom portion 152 and outer portion 154 may be injection molded around the back plate 98. A plurality of cuts 128 may be formed in these portions to allow for thermal expansion and contraction of the material without deforming or buckling the back plate 98.

With reference again to FIG. 4, in this example the projection portion 108 of backlight housing 100 comprises a shelf 130. The rear polarizer substrate 82 extends over and is bonded to the shelf 130 of the backlight housing via an adhesive layer 134. Additionally, a secured end 89 of the upper optical film layer 88 is bonded to the wall 110 via another adhesive layer 91. The left ends of each of the diffuser substrate 90, light guide plate 92, and reflective film layer 96 also abut the wall 110. In this manner and as described in more detail below, by affixing the rear polarizer substrate 82 to the shelf 130 and by abutting the left ends of each of the diffuser substrate 90, light guide plate 92, and reflective film layer 96 to the wall 110, the non-active display area of bezel 216 may be reduced.

In this example, the non-active display area is defined by the bezel 216 between the active display area left edge 62 and the left edge 222 of left projection 56 of chassis 220, with the bezel having a width indicated at 218. The active display area left edge 62 is aligned with the left ends of each of the diffuser substrate 90, light guide plate 92, and reflective film layer 96. In one example and with reference to FIG. 7, the active display area may include those portions of cover glass 234 located to the right of active display area left edge 62 and continuing to an active display area right edge 68 located adjacent to the right end of the right side display 204 and aligned with wall 124. Accordingly, by affixing the rear polarizer substrate 82 to the shelf 130, abutting the left ends of each of the diffuser substrate 90, light guide plate 92, and reflective film layer 96 to the wall 110, and utilizing other structural details described above, the configuration of the display 204 of FIG. 4 may provide a bezel 216 with a width 218 of approximately 1.14 mm.

In the example of FIG. 4, the bezel 216 comprises a thickness 140 of the left projection 56 of chassis 220 and a distance 150 from the left ends of components of the display unit 64 to the active display area left edge 62. As noted above, in some examples a width 218 of bezel 216 may be approximately 1.14 mm, which may comprise a distance 140 of approximately 0.54 mm and a distance 150 of approximately 0.60 mm.

In some examples, the adhesive layer 134 between rear polarizer substrate 82 and shelf 130 may comprise a black or otherwise opaque material to block visibility of the light source, backlight housing 100 and/or other components of the display device. Additionally, by abutting the left ends of each of the diffuser substrate 90, light guide plate 92, and reflective film layer 96 to the wall 110, this configuration eliminates any gaps between the wall 110 and adjacent components. Advantageously, any light leakage that could result from light from the light source bypassing the light guide plate 92 is also prevented. Additionally and with this configuration, the cover glass substrate 234 may not be affixed to the chassis 220.

Figure 7:
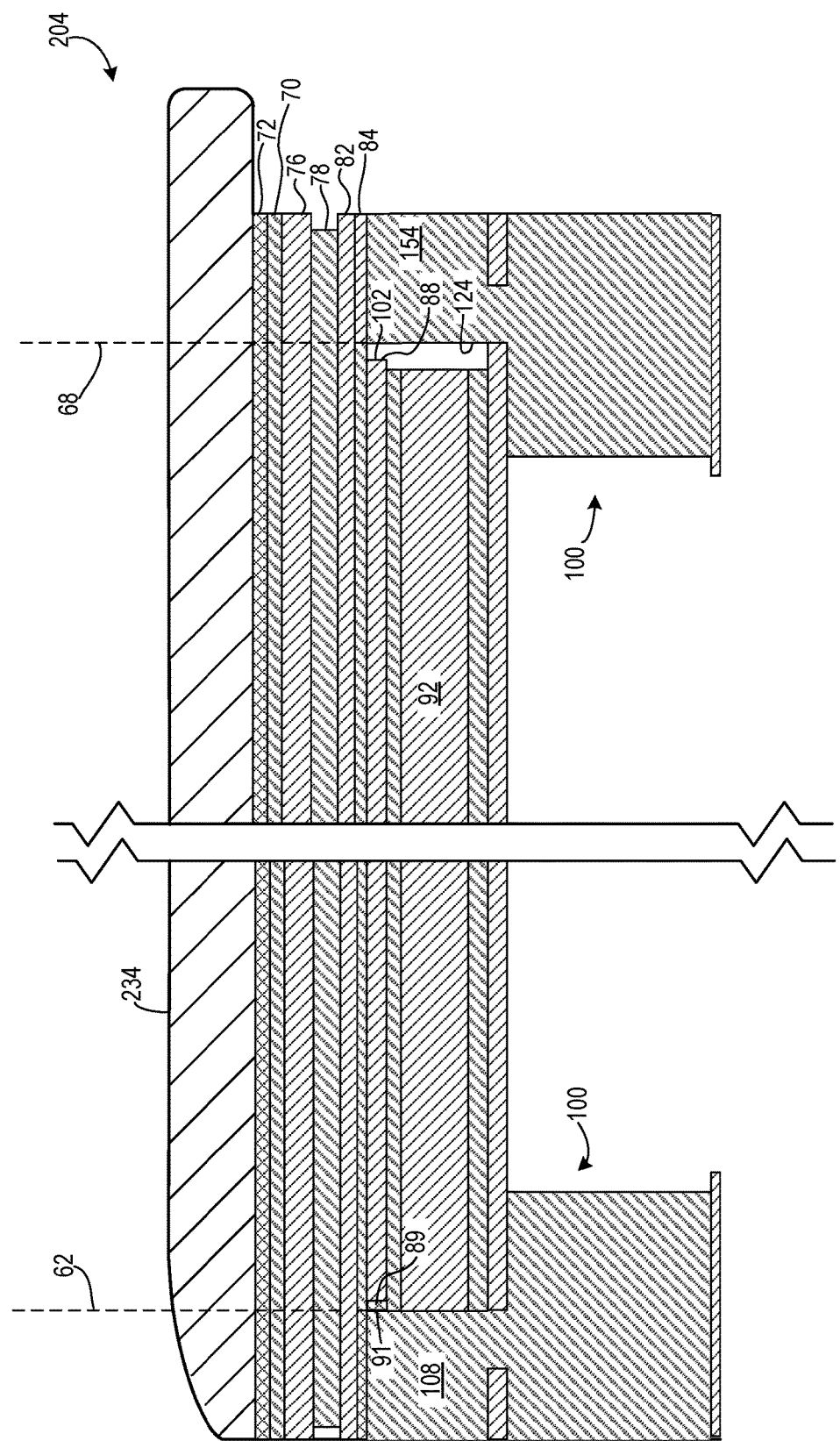
FIG. 7 shows another partial cross section view of the right side display of the dual-display device of FIG. 2 according to examples of the present disclosure.

With reference now to FIG. 7, in some examples the upper optical film layer 88 may include an unattached end 102 opposite to the secured end 89. In this example, a gap is provided between the unattached end 102 and the wall 124 of outer portion 154. Accordingly and with this configuration, by allowing unattached end 102 of the upper optical film layer 88 to remain free, the optical film layer may laterally expand or contract without buckling or otherwise deforming other components of the display unit 64.

Figure 8:
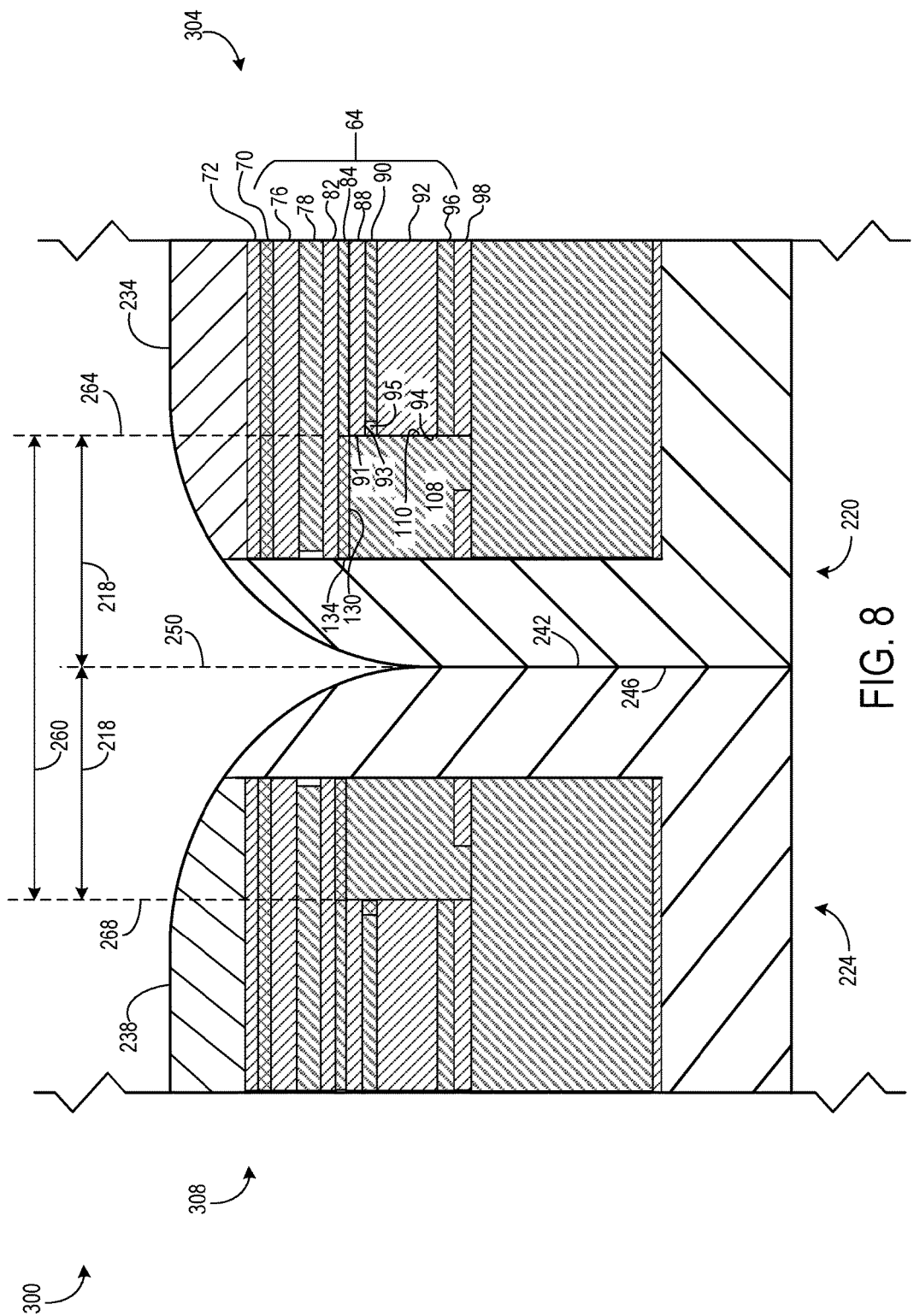
FIG. 8 shows a partial cross section view of a dual-display device according to another example of the present disclosure.

With reference now to FIG. 8, another embodiment of a dual-display device 300 of the present disclosure is illustrated. In this example, the dual-display device 300 utilizes the same components and configurations described above for display device 200. In this example, however, a bottom surface 93 of the upper optical film layer 88 is bonded to the light guide plate 92. In some examples, the bottom surface 93 is bonded to the light guide plate 92 with a separate adhesive layer 95. In some examples, adhesive layer 95 may be embedded within the diffuser substrate 90.

As with the dual-display device 200 described above and illustrated in FIG. 7, the upper optical film layer 88 may include an unattached end opposite to the secured end 89. The unattached end may be located in a gap that enables the upper optical film layer 88 to laterally expand or contract without buckling or otherwise deforming other components of the display unit 64. As with the dual-display device 200 described above, the configuration of the left side display 308 of the dual-display device 300 shown in FIG. 8 may be a mirror image of the configuration illustrated for the right side display 304. Additionally, the reduced bezel widths and structural configurations to prevent light leakage discussed above are also provided by the configuration of dual-display device 300.

Figure 9:
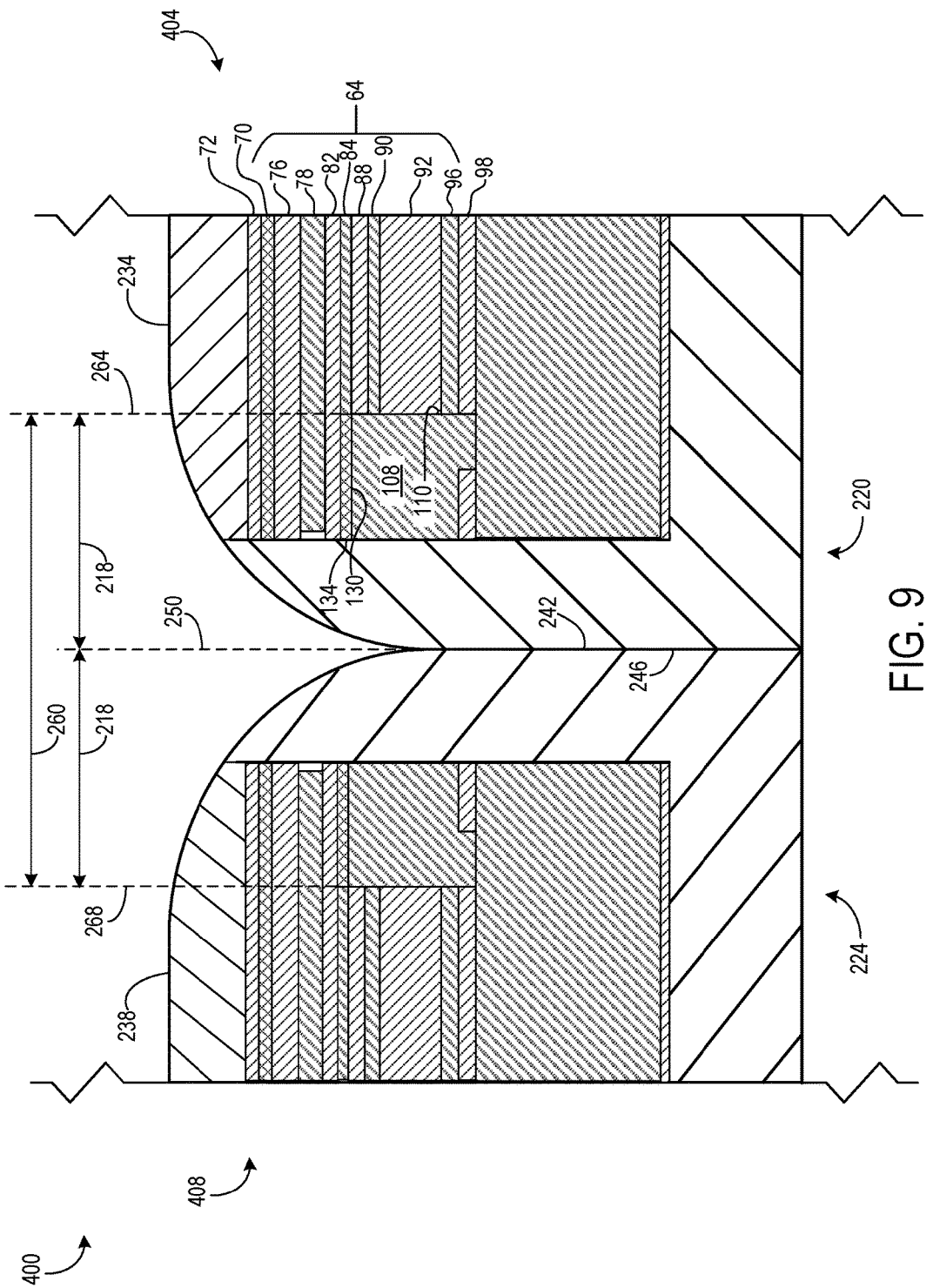
FIG. 9 shows a partial cross section view of a dual-display device according to another example of the present disclosure.
Figure 10:
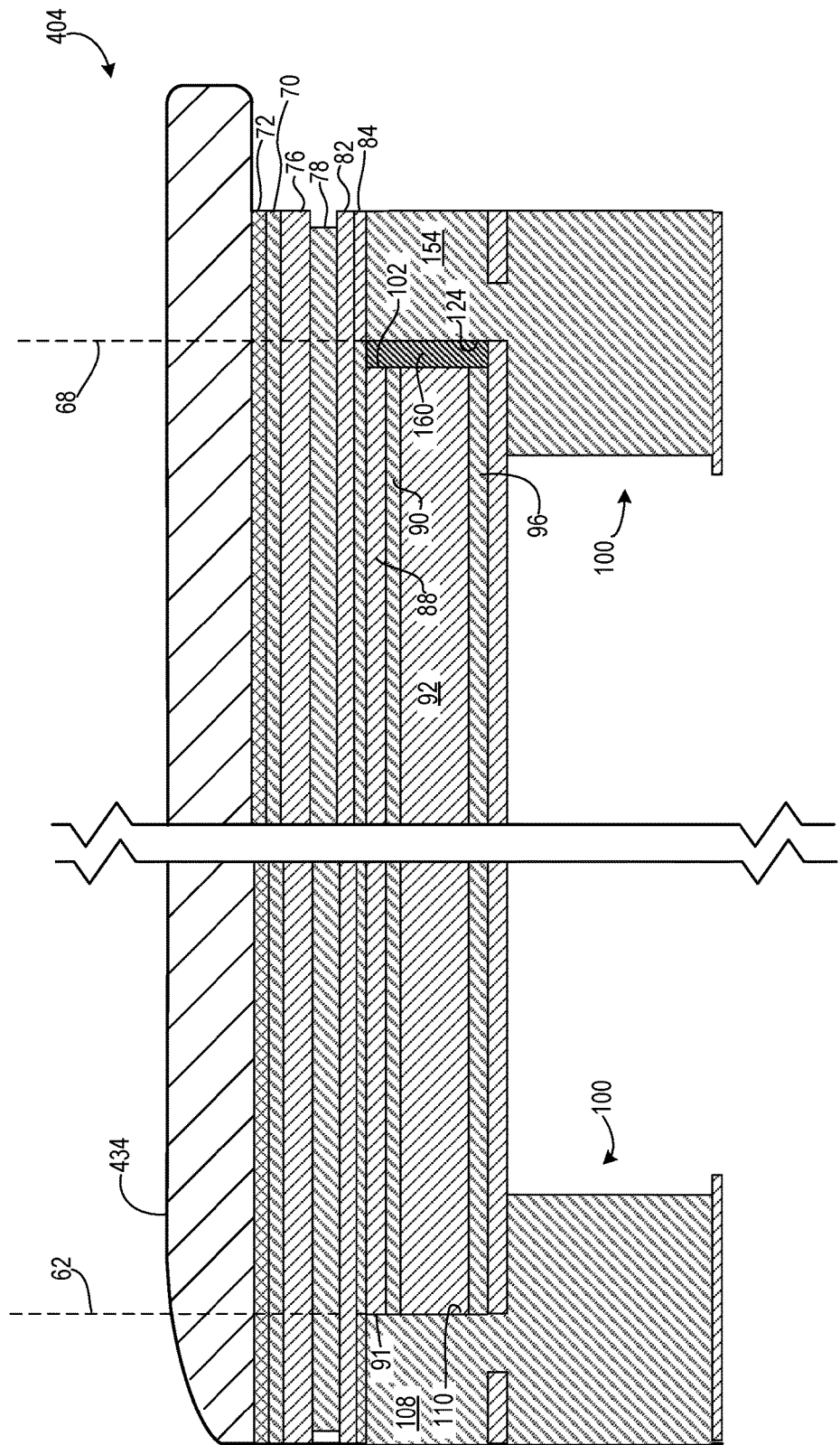
FIG. 10 shows another partial cross section view of the right side display of the dual-display device of FIG. 9 according to examples of the present disclosure.

With reference now to FIGS. 9 and 10, another embodiment of a dual-display device 400 of the present disclosure is illustrated. In this example, the dual-display device 400 utilizes the same components and configurations described above for display device 200. In this example, however, in each of the right side display 404 and left side display 408, a biasing element biases the upper optical film layer against the projection portion of the backlight housing. In this manner and as described in more detail below, the upper optical film layer is not bonded to the projection portion 108 or light guide plate 92 and may expand or contract without wrinkling or buckling. Additionally, one or more other layers/substrates of the display unit 64 also may be biased by the biasing element against the projection portion.

As shown in FIGS. 9 and 10, the backlight housing 100 comprises inner wall 110 of projection portion 108 and an outer wall 124 of outer portion 154. A biasing element 160 is located between the unattached (outer) end 102 of the upper optical film layer 88 and the outer wall 124. In the example shown in FIG. 10, the biasing element 160 comprises a foam material that biases the upper optical film layer 88 toward inner wall 110. Additionally, resilient properties of the foam material enable the upper optical film layer 88 to laterally expand or contract due to thermal variations or other environmental conditions. In this manner, this configuration allows the upper optical film layer 88 to experience a variety of environmental conditions without wrinkling or buckling, and without wrinkling or otherwise deforming other components of the display unit 64. In other examples, any other suitable resilient materials, such as elastomeric materials, may be utilized for the biasing element 160. In other examples, biasing element 160 may comprise a spring or other elastic object.

In the example of FIGS. 9 and 10, additional layers of the display unit are also biased by the biasing element 160 toward and against inner wall 110. For example, the diffuser substrate 90 is biased by the biasing element 160 against the inner wall 110. In a similar manner, the light guide plate 92 and reflective film layer 96 are biased by the biasing element 160 against the inner wall 110.

As with the dual-display device 200 described above, the configuration of the left side display 408 of the dual-display device 400 shown in FIG. 9 may be a mirror image of the configuration illustrated for the right side display 404 in FIG. 10. Additionally, the reduced bezel widths and structural configurations to prevent light leakage discussed above are also provided by the dual-display device 400.

Figure 11:
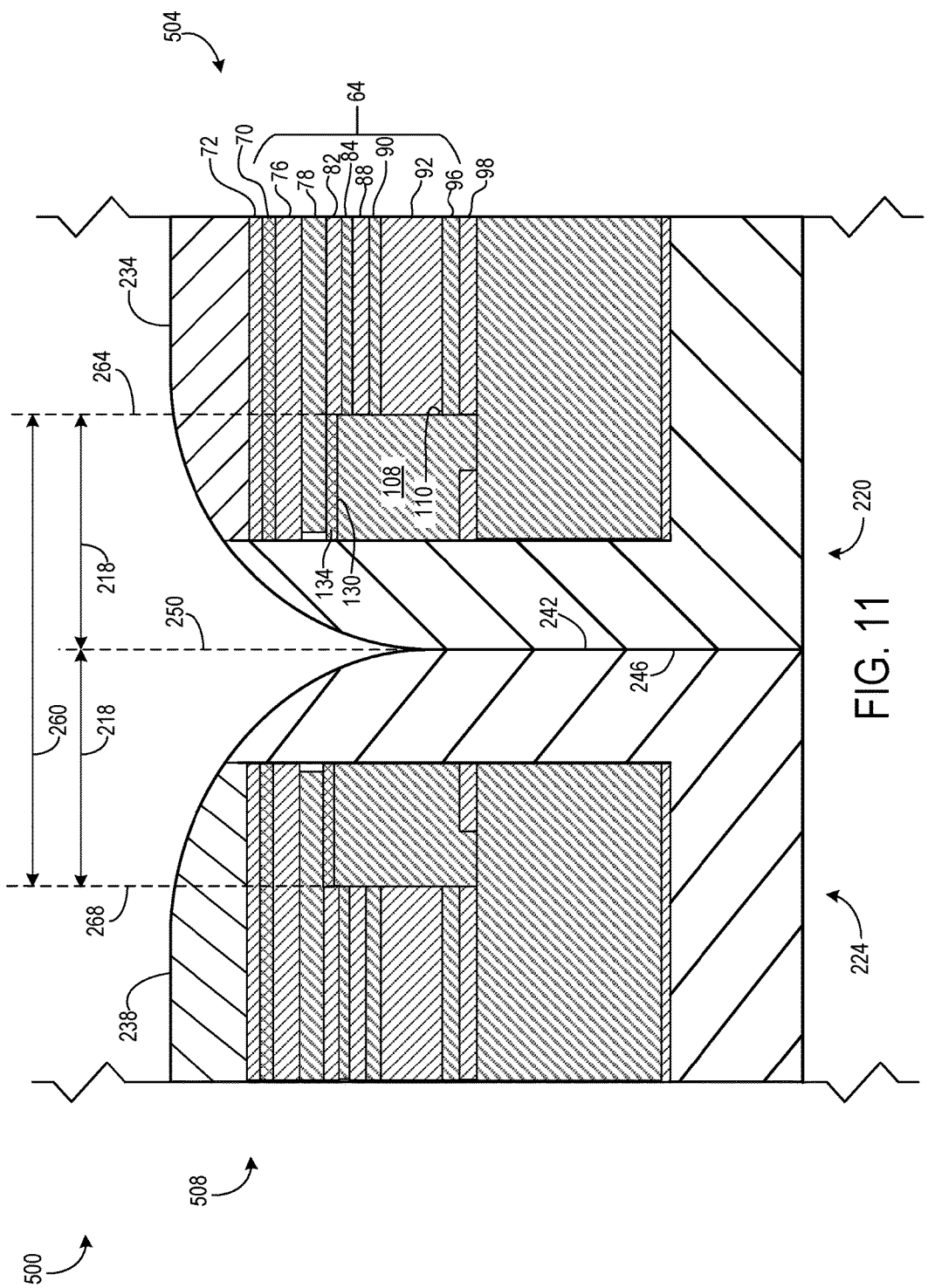
FIG. 11 shows a partial cross section view of a dual-display device according to another example of the present disclosure.
Figure 12:
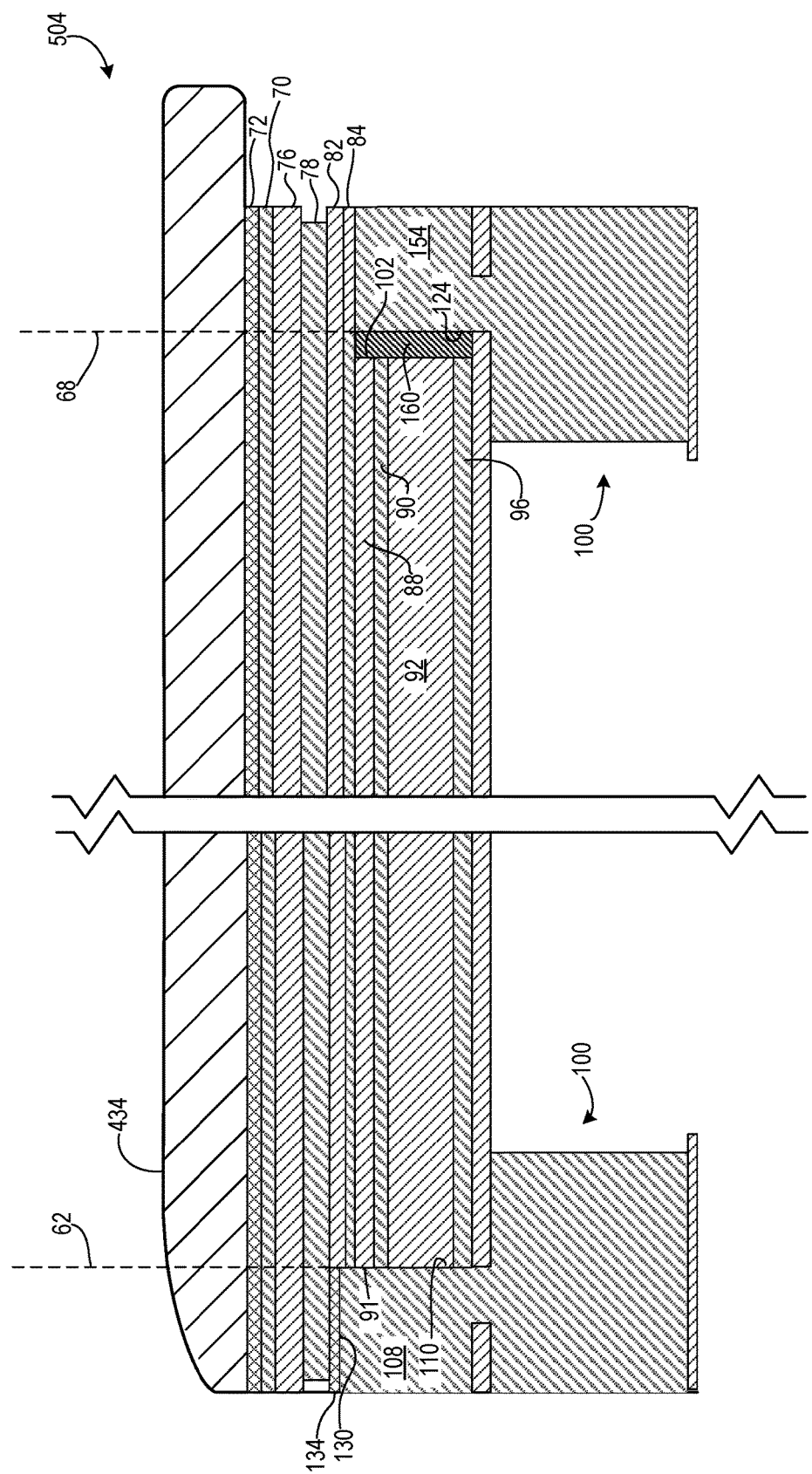
FIG. 12 shows another partial cross section view of the right side display of the dual-display device of FIG. 11 according to examples of the present disclosure.

With reference now to FIGS. 11 and 12, another example of a dual-display device 500 of the present disclosure is illustrated. In this example, the dual-display device 500 utilizes the same components and configurations described above for display device 400, including biasing element 160 that biases the upper optical film layer 88 toward inner wall 110. In this example, however, instead of bonding the rear polarizer 82 to the shelf 130 of the projection portion 108, an edge portion of the display glass substrate 78 is bonded to the projection portion via an adhesive layer 134.

In the example of FIGS. 11 and 12, additional layers of the display unit 64 also are biased by the biasing element 160 toward and against inner wall 110. For example, the diffuser substrate 90, light guide plate 92 and reflective film layer 96 are biased by the biasing element 160 against the inner wall 110. In a similar manner, the reflective film layer 96 is biased by the biasing element 160 the inner wall 110.

As with the dual-display device 400 described above, the configuration of the left side display 508 of the dual-display device 500 shown in FIG. 11 may be a mirror image of the configuration illustrated for the right side display 504 shown in FIG. 12. Additionally, the reduced bezel widths and structural configurations to prevent light leakage discussed above are also provided by the dual-display device 500.

Figure 13:
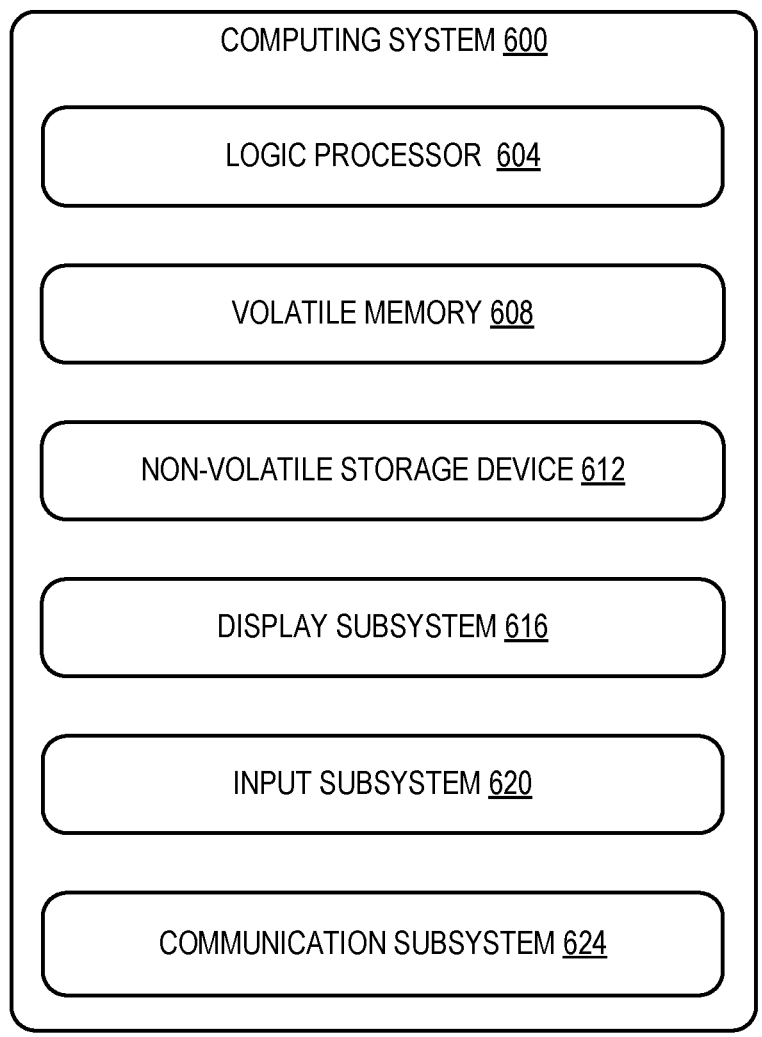
FIG. 13 shows a computing system according to an example of the present disclosure.

FIG. 13 schematically shows a non-limiting embodiment of a computing system 600. The dual-display devices shown in FIGS. 1, 2, and 8-12 may include one or more aspects of computing system 600. Computing system 600 is shown in simplified form. It is to be understood that virtually any computer architecture may be used without departing from the scope of this disclosure. Computing system 600 includes a logic processor 604, volatile memory 608, and a non-volatile storage device 612. Computing system 600 may optionally include a display subsystem 616, input subsystem 620, communication subsystem 624, and/or other components not shown in FIG. 13.

Logic processor 604 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 604 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 608 may include physical devices that include random access memory. Volatile memory 608 is typically utilized by logic processor 604 to temporarily store information during processing of software instructions. It will be appreciated that volatile memory 608 typically does not continue to store instructions when power is cut to the volatile memory 608.

Non-volatile storage device 612 includes one or more physical devices configured to hold instructions executable by the logic processors to implement the methods and processes described herein. When such methods and processes are implemented, the state of non-volatile storage device 612 may be transformed—e.g., to hold different data.

Non-volatile storage device 612 may include physical devices that are removable and/or built-in. Non-volatile storage device 612 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 612 may include nonvolatile, dynamic, static, read/write, read-only, sequential-access, location-addressable, file-addressable, and/or content-addressable devices. It will be appreciated that non-volatile storage device 612 is configured to hold instructions even when power is cut to the non-volatile storage device 612.

Aspects of logic processor 604, volatile memory 608, and non-volatile storage device 612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 616 may be used to present a visual representation of data held by non-volatile storage device 612. As the herein described methods and processes change the data held by the non-volatile storage device, and thus transform the state of the non-volatile storage device, the state of display subsystem 616 may likewise be transformed to visually represent changes in the underlying data. Display subsystem 616 may include one or more display devices utilizing virtually any type of technology. Such display devices may be combined with logic processor 604, volatile memory 608, and/or non-volatile storage device 612 in a shared enclosure, or such display devices may be peripheral display devices.

When included, input subsystem 620 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, inertial measurement unit, and/or gyroscope for motion detection, gaze detection, and/or intent recognition, electric-field sensing componentry for assessing brain activity, any of the sensors described above with respect to HMD device 18, and/or any other suitable sensor.

When included, communication subsystem 624 may be configured to communicatively couple computing system 600 with one or more other computing devices. Communication subsystem 624 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

The following paragraphs provide additional support for the claims of the subject application. One aspect provides a display device, comprising: a first chassis; a first backlight housing attached to the first chassis and comprising a first wall; a first optical film layer between a first light guide plate and a first rear polarizer, the first optical film layer comprising a secured end bonded to the first wall; a second chassis rotatably coupled to the first chassis; a second backlight housing attached to the second chassis and comprising a second wall; and a second optical film layer between a second light guide plate and a second rear polarizer, the second optical film layer comprising a secured end bonded to the second wall. The display device may additionally or alternatively include, wherein the first optical film layer comprises an unattached end opposite to the secure end. The display device may additionally or alternatively include, wherein the first rear polarizer is bonded to a first shelf that extends from the first wall of the backlight housing. The display device may additionally or alternatively include, wherein the first rear polarizer is bonded to the first shelf with a black adhesive component. The display device may additionally or alternatively include, wherein when the first light guide plate and the second light guide plate are substantially coplanar, a deadband region is defined between an inner edge of a first active display area and an inner edge of a second active display area, the deadband region having a width of approximately 2.28 mm. The display device may additionally or alternatively include, wherein the first wall extends from a first footing of the backlight housing, and the first footing is bonded to the first chassis.

Another aspect provides a dual-display device, comprising: a first chassis; a first backlight housing attached to the first chassis and comprising a first wall; a first light guide plate; a first optical film layer between the first light guide plate and a first rear polarizer, the first optical film layer comprising a first bottom surface bonded to the first light guide plate; a second chassis rotatably coupled to the first chassis; a second backlight housing attached to the second chassis and comprising a second wall; a second light guide plate; and a second optical film layer between the second light guide plate and a second rear polarizer, the second optical film layer comprising a second bottom surface bonded to the second light guide plate. The dual-display device may additionally or alternative include a first diffuser between the first light guide plate and the first optical film layer, the first diffuser comprising an adhesive that bonds the first optical film layer to the first light guide plate. The dual-display device may additionally or alternative include, wherein the first bottom surface is bonded to first light guide plate at a secured end of the first optical film layer, and the first optical film layer comprises an unattached end opposite to the secure end. The dual-display device may additionally or alternative include, wherein the first rear polarizer is bonded to a first shelf that extends from the first wall of the backlight housing. The dual-display device may additionally or alternative include, wherein the first rear polarizer is bonded to the first shelf with a black adhesive component. The dual-display device may additionally or alternative include, wherein when the first light guide plate and the second light guide plate are substantially coplanar, a deadband region is defined between an inner edge of a first active display area and an inner edge of a second active display area, the deadband region having a width of approximately 2.28 mm. The dual-display device may additionally or alternative include, wherein the first wall extends from a first footing of the backlight housing, and the first footing is bonded to the first chassis.

Another aspect provides a dual-display device, comprising: a first chassis; a first backlight housing attached to the first chassis and comprising a first inner wall and a first outer wall; a first optical film layer between a first light guide plate and a first rear polarizer, the first optical film layer comprising a first outer end; a first biasing element between the first outer end of the first optical film layer and the first outer wall, the first biasing element biasing the optical film layer against the first inner wall; a second chassis rotatably coupled to the first chassis; a second backlight housing attached to the second chassis and comprising a second inner wall and a second outer wall; a second optical film layer between a second light guide plate and a second rear polarizer, the second optical film layer comprising a second outer end; and a second biasing element between the second outer end of the second optical film layer and the second outer wall, the second biasing element biasing the optical film layer against the second inner wall. The dual-display device may additionally or alternative include a first diffuser layer between the first light guide plate and the first optical film layer, wherein the first biasing element is between a first outer end of the first diffuser layer and the first outer wall, the first biasing element biasing the first diffuser layer against the first inner wall. The dual-display device may additionally or alternative include a first reflective film layer on an opposite side of the first light guide plate from the first diffuser layer, wherein the first biasing element is between a first outer end of the first reflective film layer and the first outer wall, the first biasing element biasing the first reflective film layer against the first inner wall. The dual-display device may additionally or alternative include, wherein the first biasing element and the second biasing element each comprise a spring or foam material. The dual-display device may additionally or alternative include wherein when the first light guide plate and the second light guide plate are substantially coplanar, a deadband region is defined between an inner edge of a first active display area and an inner edge of a second active display area, the deadband region having a width of approximately 2.28 mm. The dual-display device may additionally or alternative include wherein the first rear polarizer is bonded to a first shelf that extends from the first wall of the backlight housing. The dual-display device may additionally or alternative include wherein the first rear polarizer is between a first display glass substrate and the first light guide plate, and the first display glass substrate is bonded to a first shelf that extends from the first wall of the backlight housing.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and sub-combinations of the various components, configurations, and other features, functions, acts, and/or properties disclosed herein, as well as any and all equivalents thereof.

The invention claimed is:

1. A display device, comprising:
   a first chassis;
   a first backlight housing attached to the first chassis and comprising a first wall;
   a first optical film layer between a first light guide plate and a first rear polarizer, the first optical film layer comprising a secured end bonded to the first wall;
   a second chassis rotatably coupled to the first chassis;
   a second backlight housing attached to the second chassis and comprising a second wall; and
   a second optical film layer between a second light guide plate and a second rear polarizer, the second optical film layer comprising a secured end bonded to the second wall.

2. The display device of claim 1, wherein the first optical film layer comprises an unattached end opposite to the secured end.

3. The display device of claim 1, wherein the first rear polarizer is bonded to a first shelf that extends from the first wall of the first backlight housing.

4. The display device of claim 3, wherein the first rear polarizer is bonded to the first shelf with a black adhesive component.

5. The display device of claim 1, wherein when the first light guide plate and the second light guide plate are substantially coplanar, a deadband region is defined between an inner edge of a first active display area and an inner edge of a second active display area, the deadband region having a width of approximately 2.28 mm.

6. The display device of claim 1, wherein the first wall extends from a first footing of the first backlight housing, and the first footing is bonded to the first chassis.

7. A dual-display device, comprising:
   a first chassis;
   a first backlight housing attached to the first chassis and comprising a first wall;
   a first light guide plate;
   a first optical film layer between the first light guide plate and a first rear polarizer, the first optical film layer abutting the first wall of the first backlight housing and comprising a first bottom surface bonded to the first light guide plate;
   a second chassis rotatably coupled to the first chassis;
   a second backlight housing attached to the second chassis and comprising a second wall;
   a second light guide plate; and
   a second optical film layer between the second light guide plate and a second rear polarizer, the second optical film layer abutting the second wall of the second backlight housing and comprising a second bottom surface bonded to the second light guide plate.

8. The dual-display device of claim 7, further comprising a first diffuser between the first light guide plate and the first optical film layer, the first diffuser comprising an adhesive that bonds the first optical film layer to the first light guide plate.

9. The dual-display device of claim 7, wherein the first bottom surface is bonded to the first light guide plate at a secured end of the first optical film layer, and the first optical film layer comprises an unattached end opposite to the secured end.

10. The dual-display device of claim 7, wherein the first rear polarizer is bonded to a first shelf that extends from the first wall of the first backlight housing.

11. The dual-display device of claim 10, wherein the first rear polarizer is bonded to the first shelf with a black adhesive component.

12. The dual-display device of claim 7, wherein when the first light guide plate and the second light guide plate are substantially coplanar, a deadband region is defined between an inner edge of a first active display area and an inner edge of a second active display area, the deadband region having a width of approximately 2.28 mm.

13. The dual-display device of claim 7, wherein the first wall extends from a first footing of the first backlight housing, and the first footing is bonded to the first chassis.

14. A dual-display device, comprising:
   a first chassis;
   a first backlight housing attached to the first chassis and comprising a first inner wall and a first outer wall;
   a first optical film layer between a first light guide plate and a first rear polarizer, the first optical film layer comprising a first outer end;
   a first biasing element between the first outer end of the first optical film layer and the first outer wall, the first biasing element biasing the first optical film layer against the first inner wall;
   a second chassis rotatably coupled to the first chassis;
   a second backlight housing attached to the second chassis and comprising a second inner wall and a second outer wall;
   a second optical film layer between a second light guide plate and a second rear polarizer, the second optical film layer comprising a second outer end; and
   a second biasing element between the second outer end of the second optical film layer and the second outer wall, the second biasing element biasing the second optical film layer against the second inner wall.

15. The dual-display device of claim 14, further comprising a first diffuser layer between the first light guide plate and the first optical film layer, wherein the first biasing element is between a first outer end of the first diffuser layer and the first outer wall, the first biasing element biasing the first diffuser layer against the first inner wall.

16. The dual-display device of claim 15, further comprising a first reflective film layer on an opposite side of the first light guide plate from the first diffuser layer, wherein the first biasing element is between a first outer end of the first reflective film layer and the first outer wall, the first biasing element biasing the first reflective film layer against the first inner wall.

17. The dual-display device of claim 14, wherein the first biasing element and the second biasing element each comprise a spring or foam material.

18. The dual-display device of claim 14, wherein when the first light guide plate and the second light guide plate are substantially coplanar, a deadband region is defined between an inner edge of a first active display area and an inner edge of a second active display area, the deadband region having a width of approximately 2.28 mm.

19. The dual-display device of claim 14, wherein the first rear polarizer is bonded to a first shelf that extends from the first inner wall of the first backlight housing.

20. The dual-display device of claim 14, wherein the first rear polarizer is between a first display glass substrate and the first light guide plate, and the first display glass substrate is bonded to a first shelf that extends from the first inner wall of the first backlight housing.

\* \* \* \* \*